(12) United States Patent
Aoyama et al.

(10) Patent No.: US 10,141,118 B2
(45) Date of Patent: Nov. 27, 2018

(54) CARRIER SYSTEM AND PHOTOELECTRIC CONVERSION DEVICE

(71) Applicant: ADEKA CORPORATION, Tokyo (JP)

(72) Inventors: Yohei Aoyama, Tokyo (JP); Kensaku Akimoto, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 16 days.

(21) Appl. No.: 15/108,912

(22) PCT Filed: Jan. 26, 2015

(86) PCT No.: PCT/JP2015/052034
§ 371 (c)(1),
(2) Date: Jun. 29, 2016

(87) PCT Pub. No.: WO2015/118986
PCT Pub. Date: Aug. 13, 2015

(65) Prior Publication Data
US 2016/0329161 A1   Nov. 10, 2016

(30) Foreign Application Priority Data

Feb. 6, 2014   (JP) ................ 2014-021257

(51) Int. Cl.
| | |
|---|---|
| *H01G 9/20* | (2006.01) |
| *C09B 23/00* | (2006.01) |
| *C09B 57/10* | (2006.01) |
| *C09B 23/06* | (2006.01) |

(52) U.S. Cl.
CPC ........... *H01G 9/2059* (2013.01); *C09B 23/00* (2013.01); *C09B 23/06* (2013.01); *C09B 57/10* (2013.01); *H01G 9/204* (2013.01); *H01G 9/2013* (2013.01); *H01G 9/2031* (2013.01); *Y02E 10/542* (2013.01); *Y02P 70/521* (2015.11)

(58) Field of Classification Search
CPC ...... H01G 9/20; H01G 9/2059; H01G 9/2013; H01G 9/2031; H01G 9/204; C09B 23/00; C09B 57/10; C09B 23/06; Y02E 10/542; Y02P 70/521
USPC .......................................... 252/500; 136/263
See application file for complete search history.

(56) References Cited

U.S. PATENT DOCUMENTS

| | | |
|---|---|---|
| 2008/0210296 A1 | 9/2008 | Morooka et al. |
| 2009/0000658 A1 | 1/2009 | Zakeeruddin et al. |
| 2011/0144061 A1* | 6/2011 | Kato .................. B82Y 30/00 514/94 |
| 2011/0297236 A1 | 12/2011 | Morooka et al. |
| 2013/0206234 A1 | 8/2013 | Maruyama |
| 2018/0204683 A1* | 7/2018 | Watanabe .............. C09B 57/10 |

FOREIGN PATENT DOCUMENTS

| | | |
|---|---|---|
| CN | 101138126 | 3/2008 |
| DE | 11 2011 103 442 | 8/2013 |
| JP | 2008-507570 | 3/2008 |
| JP | 2012-216496 | 11/2012 |
| JP | 2013-149446 | 8/2013 |
| JP | 2013-258110 | 12/2013 |
| JP | 2014-110133 | 6/2014 |

OTHER PUBLICATIONS

CAS reg. No. 1803087-96-8, Sep. 1, 2015. (Year: 2015).*
International Search Report, PCT/JP2015/052034, dated Apr. 28, 2015.
Extended European Search Report—EP 15 74 7058—dated Aug. 23, 2017.

* cited by examiner

*Primary Examiner* — Douglas J McGinty
(74) *Attorney, Agent, or Firm* — Young & Thompson (57) ABSTRACT

A carrier system carries a dye (A) and a co-adsorbent (B) represented by general formula (1):

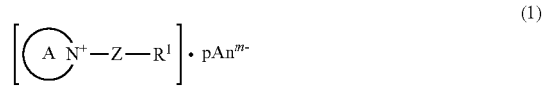

wherein, ring A represents a 5- or 6-membered heterocycle and may further be fused; a hydrogen atom in the ring A may be replaced by a halogen atom, a cyano group, a nitro group, an —$OR^2$ group, an —$SR^2$ group, or a hydrocarbon group that may have a substituent; Z represents a divalent aliphatic hydrocarbon group that is interrupted zero to three times by —O— etc.; $Z^1$ represents a divalent aromatic group; $R^1$ represents a carboxylic acid group, a sulfonic acid group, a phosphoric acid group, or a phosphonic acid group; $R^2$ and $R^3$ each represent a hydrogen atom or a hydrocarbon group that may have a substituent; $An^{m-}$ represents an m-valent anion; m represents an integer of 1 or 2; and p represents a coefficient for keeping the electrical charge neutral.

12 Claims, 1 Drawing Sheet

CARRIER SYSTEM AND PHOTOELECTRIC CONVERSION DEVICE

TECHNICAL FIELD

The present invention relates to a carrier system and a photoelectric conversion device provided with an electrode including the carrier system.

BACKGROUND ART

Dyes have been widely used in a variety of technical fields so far. In the field of photoelectric conversion devices such as solar cells, for instance, dyes having photosensitizing properties have been used in dye-sensitized photoelectric conversion devices. Dye-sensitized photoelectric conversion devices are expected to theoretically achieve high efficiency and be produced at lower cost than conventional photoelectric conversion devices employing silicon semiconductors. Unfortunately, dye-sensitized photoelectric conversion devices have the following problem: the absorption wavelengths of sensitizing dyes are limited compared to that of silicon, and therefore, the light utilization efficiency thereof is low, which results in a low photoelectric conversion efficiency of the devices.

Methods for solving the aforementioned problem have been studied, such as the use of a co-adsorbent in addition to a sensitizing dye (Patent Literature 1). This has been studied with the aim of suppressing aggregation/agglomeration of sensitizing dye particles when the sensitizing dye is adsorbed (fixed) onto a carrier such as an oxide semiconductor.

CITATION LIST

Patent Literature

Patent Literature 1: JP 2013-258110A

SUMMARY OF INVENTION

Technical Problem

An objective of the present invention is to provide a carrier system that achieves high photoelectric conversion efficiency, and a photoelectric conversion device using the carrier system.

Solution to Problem

As a result of extensive studies, the present inventors have found that the aforementioned objective can be achieved by combining a sensitizing dye with a specific co-adsorbent. The present invention has been completed based on these findings.

The present invention provides a carrier system carrying a dye (A) and a co-adsorbent (B) represented by general formula (1) below:

[Chem. 1A]

(1)

wherein, ring A represents a 5- or 6-membered heterocycle and may further be fused with another cyclic group; a hydrogen atom in the ring A may be replaced by a halogen atom, a cyano group, a nitro group, an $-OR^2$ group, an $-SR^2$ group, or a hydrocarbon group that has a substituent or that is not substituted;

Z represents a divalent aliphatic hydrocarbon group that is interrupted zero to three times by $-O-$, $-S-$, $-CO-$, $-COO-$, $-OCO-$, $-CONR^3-$, $-NR^3CO-$, or $-Z^1-$;

$Z^1$ represents a divalent aromatic group;

$R^1$ represents a group selected from a carboxylic acid group, a sulfonic acid group, a phosphoric acid group, and a phosphonic acid group;

$R^2$ and $R^3$ each independently represent a hydrogen atom or a hydrocarbon group that has a substituent or that is not substituted;

$An^{m-}$ represents an m-valent anion;

m represents an integer of 1 or 2; and p represents a coefficient for keeping the electrical charge neutral.

The present invention also provides a photoelectric conversion device provided with an electrode including the aforementioned carrier system.

The present invention also provides a dye-sensitized solar cell including the aforementioned photoelectric conversion device.

Effects of Invention

A photoelectric conversion device using the carrier system of the invention exhibits excellent photoelectric conversion efficiency and is suitable for solar cells etc.

DESCRIPTION OF EMBODIMENTS

A carrier system of the present invention and a photoelectric conversion device using the carrier system will be described below by way of preferred embodiments thereof.

First, the carrier system of the present invention will be described.

Examples of materials (carriers) used in the carrier system of the present invention include: organic resins, such as acrylic resins and fluororesins; metal oxides, such as titanium oxide, zinc oxide, and aluminum oxide; silicon oxide, zeolite, and activated carbon. Preferred are those having a porous surface. A metal oxide or silicon oxide is preferably used in cases where the carrier is used for a photoelectric conversion device. The compounds to be carried by the carrier are characterized by including at least one sensitizing dye (A) and at least one co-adsorbent (B) described below.

The form of the carrier is not particularly limited and may be chosen from, for example, thin film, powder, or granules as appropriate to the use of the carrier system. The size of the carrier and the amount of the sensitizing dye (A) and co-adsorbent (B) to be carried in the carrier system of the present invention are not particularly limited and may be chosen as appropriate depending on the use of the carrier system.

Sensitizing Dye (A):

Examples of sensitizing dyes include organic dyes, such as eosin Y, dibromofluorescein, fluorescein, rhodamine B, pyrogallol, dichlorofluorescein, Erythrosine B (Erythrosine is a registered trademark), fluorescin, mercurochrome, cyanine dyes, merocyanine disazo dyes, trisazo dyes, anthraquinone dyes, polycyclic quinone dyes, indigo dyes, diphenylmethane dyes, trimethylmethane dyes, quinoline dyes, benzophenone dyes, naphthoquinone dyes, perylene dyes, fluorenone dyes, squarylium dyes, azulenium dyes, perinone dyes, quinacridone dyes, metal-free phthalocyanine dyes, and metal-free porphyrine dyes. It is preferable that the aforementioned organic dyes have at least one anchor group (e.g. a carboxyl group, a sulfonic acid group, a phosphoric acid group, or the like) that can be bonded or adsorbed to the carrier. An example of the organic dye includes a cyanine-based dye represented by general formula (3) below. The various types of organic dyes described above may be used singly or in combinations of a plurality thereof.

[Chem. 1A]

(3)

In the formula, ring C and ring C' each represent a benzene ring, a naphthalene ring, a phenanthrene ring, or a pyridine ring;

$R_{11}$ and $R_{11}'$ each represent a hydroxyl group, a halogen atom, a nitro group, a cyano group, a sulfonic acid group, a phosphoric acid group, a carboxylic acid group, an amino group, an amide group, a ferrocenyl group, a $C_{6-30}$ aryl group, a $C_{7-30}$ arylalkyl group, a $C_{4-20}$ heterocycle-containing group, or a $C_{1-8}$ alkyl group;

the $C_{6-30}$ aryl group, the $C_{7-30}$ arylalkyl group, the $C_{4-20}$ heterocycle-containing group, and the $C_{1-8}$ alkyl group may be substituted by a hydroxyl group, a halogen atom, a nitro group, a cyano group, a sulfonic acid group, a phosphoric acid group, a carboxylic acid group, an amino group, an amide group, or a ferrocenyl group, and/or may be interrupted by —O—, —S—, —CO—, —COO—, —OCO—, —SO$_2$—, —NH—, —CONH—, —NHCO—, —N=CH—, or CH=CH—;

$X_1$ and $X_1'$ each represent an oxygen atom, a sulfur atom, a selenium atom, —CR$_{51}$R$_{52}$—, a $C_{3-6}$ cycloalkane-1,1-diyl group, —NH—, or —NY$_{12}$—;

$R_{51}$ and $R_{52}$ each represent a hydrogen atom or any one of groups mentioned as $R_{11}$ and $R_{11}'$;

Y, Y', and $Y_{12}$ each represent a hydrogen atom, or a $C_{1-20}$ alkyl group, a $C_{6-30}$ aryl group, or a $C_{7-30}$ arylalkyl group that may be substituted by a hydroxyl group, a halogen atom, a cyano group, a carboxylic acid group, an amino group, an amide group, a ferrocenyl group, a sulfonic acid group, a phosphoric acid group, —SiR$_{16}$R$_{17}$R$_{18}$, or a nitro group;

$R_{16}$, $R_{17}$, and $R_{18}$ each represent a hydrogen atom or any one of groups mentioned for $R_{11}$ and $R_{11}'$;

a methylene group in the alkyl group, aryl group, and arylalkyl group in Y, Y', and $Y_{12}$ may be interrupted by —O—, —S—, —CO—, —COO—, —OCO—, —SO$_2$—, —NH—, —CONH—, —NHCO—, —N=CH—, or CH=CH—;

$Z_{11}$, $Z_{12}$, and $Z_{13}$ each independently represent a hydrogen atom, a hydroxyl group, a halogen atom, a cyano group, —NRR', a $C_{6-30}$ aryl group, a $C_{7-30}$ arylalkyl group, or a $C_{1-20}$ alkyl group;

the —NRR', the aryl group, the arylalkyl group, and the alkyl group may further be substituted by a hydroxyl group, a halogen atom, a cyano group, or NRR', and may be interrupted by —O—, —S—, —CO—, —COO—, —OCO—, —SO$_2$—, —NH—, —CONH—, —NHCO—, —N=CH—, or CH=CH—;

R and R' each independently represent a $C_{6-30}$ aryl group, a $C_{7-30}$ arylalkyl group, or a $C_{1-20}$ alkyl group;

s represents a number from 0 to 4;

r and r' each represent zero or the number of $R_{11}$ or $R_{11}'$ substitutable in the ring C or the ring C';

An$^{q-}$ represents a q-valent anion;

q represents 1 or 2;

p represents a coefficient for keeping the electrical charge neutral; and at least one of $R_{11}$, $R_{11}'$, $X_1$, $X_1'$, $Z_{11}$, $Z_{12}$, $Z_{13}$, Y, and Y' is a group including a sulfonic acid group, a phosphoric acid group, a phosphonic acid group, or a carboxylic acid group.

Further, it is possible to use, for example, an organic metal complex compound as the sensitizing dye (A). Specific examples of the organic metal complex compound include: organic metal complex compounds having both an ionic coordinate bond formed between a nitrogen anion of an aromatic heterocyclic ring and a metal cation and a nonionic coordinate bond formed between a nitrogen or chalcogen atom and a metal cation; and organic metal complex compounds having both an ionic coordinate bond formed between an oxygen or sulfur anion and a metal cation and a nonionic coordinate bond formed between a nitrogen or chalcogen atom and a metal cation. More specific examples include: metallophthalocyanine dyes, such as copper phthalocyanine and titanyl phthalocyanine; metallonaphthalocyanine dyes; metalloporphyrin dyes; and ruthenium complexes, such as bipyridyl ruthenium complexes, terpyridyl ruthenium complexes, phenanthroline ruthenium complexes, bicinchonate ruthenium complexes, azoruthenium complexes, and quinolinol ruthenium complexes. It is preferable that, as with the aforementioned dyes, the organic metal complex compounds have at least one anchor group that can be bonded or adsorbed to the carrier. Examples of the organic metal complex compound include a ruthenium complex represented by general formula (4) below. The various organic metal complex compounds described above may be used singly or in combinations of a plurality thereof.

[Chem. 1B]

(4).

In the formula, $L_1$ represents a unidentate ligand; $L_2$ represents a bidentate ligand represented by formula (L-1), (L-2), (L-3), (L-7), or (L-8) below; $L_3$ represents a tridentate ligand represented by formula (L-4), (L-5), or (L-6) below; n1 represents an integer from 0 to 6; n2 represents an integer from 0 to 3; n3 represents an integer from 0 to 2; n1+n2×2+n3×3=6; n2+n3>0; Xi represents a counter ion in cases where a counter ion is necessary to neutralize the electrical charge; and n4 represents a coefficient for keeping the electrical charge neutral.

[Chem. 1C]

(L-1)

(L-2)

(L-3)

(L-4)

(L-5)

(L-6)

(L-7)

(L-8)

In the formulae, $R_{21}$ represents any one of groups mentioned for $R_{11}$ in general formula (3) above; a represents an integer from 0 to 4; b represents an integer from 0 to 3; c represents an integer from 0 to 2; and at least one of the plurality of $R_{21}$ is a group including a sulfonic acid group, a phosphoric acid group, a phosphonic acid group, or a carboxylic acid group.

Examples of the unidentate ligand in the above general formula (4) include SCN, NCS, halogen atoms, and oxalic acid. Xi is for neutralizing the electrical charge, and may be a positive ion or a negative ion. Examples of the positive ion include an ammonium ion, alkali metal ions, and a proton. Examples of the negative ion include the same groups as the groups described further below as examples of An in general formula (1) described below.

Co-Adsorbent (B):

The co-adsorbent is a compound represented by the aforementioned general formula (1), and is capable of improving the sensitization ability of the sensitizing dye (A) by co-adsorption with the sensitizing dye. Thus, photoelectric convertibility is improved, and a dye-sensitized solar cell exhibiting high photoelectric conversion efficiency can be obtained.

Examples of the 5-membered ring represented by the ring A include a pyrrole ring, an imidazole ring, a pyrazole ring, a tellurazole ring, an isotellurazole ring, a selenazole ring, an isoselenazole ring, a thiazole ring, an isothiazole ring, an oxazole ring, an isooxazole ring, and a furazan ring. Examples of the 6-membered ring include a pyridine ring, a pyrazine ring, a pyrimidine ring, and a pyridazine ring. Preferred 5-membered rings include an imidazole ring, a pyrazole ring, a tellurazole ring, an isotellurazole ring, a thiazole ring, an isothiazole ring, an oxazole ring, an isooxazole ring, and a furazan ring.

Examples of the another cyclic group that may be fused with the ring A include a benzene ring and a naphthalene ring.

The number of carbon atoms of the divalent aliphatic hydrocarbon group represented by Z is not particularly limited, but is preferably from 5 to 20, and more preferably from 7 to 15. Herein, in cases where the divalent aliphatic hydrocarbon group is interrupted by a group containing carbon, the number of carbon atoms includes the number of carbon atoms in the interrupting group. The aliphatic hydrocarbon group may be branched or may form a ring. Examples of the ring include a cyclohexane ring and a cyclopentane ring. It is preferable that the $N^+$ in the ring A and $R^1$ be connected linearly with 7 to 15 atoms including the interrupting group.

Examples of the divalent aromatic group represented by $Z^1$ include a divalent group obtained by removing two hydrogen atoms from a benzene ring, a naphthalene ring, or a ring listed as examples of the ring A.

Examples of the hydrocarbon group for replacing a hydrogen atom in the ring A and examples of the hydrocarbon groups represented by $R^2$ and $R^3$ include aromatic hydrocarbon groups, aromatic hydrocarbon groups substituted by an aliphatic hydrocarbon group, and aliphatic hydrocarbon groups.

Examples of the aromatic hydrocarbon groups include phenyl, naphthyl, cyclohexyl phenyl, biphenyl, terphenyl, fluorenyl, thiophenylphenyl, furanylphenyl, 2'-phenyl-propylphenyl, benzyl, and naphthylmethyl.

As for the aforementioned aliphatic hydrocarbon groups, examples of $C_{1-20}$ aliphatic hydrocarbon groups include linear alkyl groups, branched alkyl groups, and cyclic alkyl groups, such as methyl, ethyl, propyl, isopropyl, butyl, s-butyl, t-butyl, isobutyl, amyl, isoamyl, t-amyl, hexyl, heptyl, isoheptyl, t-heptyl, n-octyl, isooctyl, t-octyl, nonyl, cyclopropyl, cyclobutyl, cyclopentyl, cyclohexyl, cycloheptyl, cyclooctyl, cyclononyl, and cyclodecyl. The $C_{1-20}$ aliphatic hydrocarbon group may be interrupted by —O—, —COO—, —OCO—, —CO—, —S—, —SO—, —SO$_2$—, —NR$^8$—, —C=C—, or —C≡C—. $R^8$ is a $C_{1-20}$ aliphatic hydrocarbon group, and examples thereof are the same as those for the aforementioned $C_{1-20}$ aliphatic hydrocarbon groups. If an interrupting group contains carbon atoms, the number of carbon atoms is from 1 to 20 including those of the interrupting group.

Examples of the aforementioned aromatic hydrocarbon groups substituted by an aliphatic hydrocarbon group include phenyl, naphthyl, and benzyl substituted by the aforementioned aliphatic hydrocarbon group.

Examples of the substituent that may substitute the aforementioned hydrocarbon group include a fluorine atom, a chlorine atom, a bromine atom, an iodine atom, a cyano group, a nitro group, a carboxylic acid group, a sulfonic acid group, a phosphoric acid group, a phosphonic acid group, a hydroxyl group, a thiol group, and a —NR$^9$R$^{10}$ group.

R$^9$ and R$^{10}$ each are a hydrogen atom or a C$_{1-20}$ aliphatic hydrocarbon group, and examples thereof are the same as those for the aforementioned C$_{1-20}$ aliphatic hydrocarbon groups. If an interrupting group contains carbon atoms, the number of carbon atoms is from 1 to 20 including those of the interrupting group.

Examples of the m-valent anion represented by An$^{m-}$ include: halogen ions such as a chlorine anion, a bromine anion, an iodine anion, and a fluorine anion; inorganic halide anions such as a perchlorate anion, a chlorate anion, a thiocyanate anion, a hexafluorophosphate anion, a hexafluoroantimonate anion, a hexafluoroarsenate anion, and a tetrafluoroborate anion; sulfonate anions such as a methane sulfonate ion, a fluorosulfonate ion, a benzene sulfonate anion, a toluene sulfonate anion, a 1-naphthylsulfonate anion, a 2-naphthylsulfonate anion, a trifluoromethane sulfonate anion, a pentafluoroethane sulfonate anion, a heptafluoropropane sulfonate anion, a nonafluorobutane sulfonate anion, an undecafluoropentane sulfonate anion, a tridecafluorohexane sulfonate anion, a pentadecafluoroheptane sulfonate anion, a heptadecafluorooctane sulfonate ion, a perfluoro-4-ethylcyclohexane sulfonate ion, a N-alkyl (or -aryl) diphenylamine-4-sulfonate anion, a 2-amino-4-methyl-5-chlorobenzene sulfonate anion, a 2-amino-5-nitrobenzene sulfonate anion, sulfonate anions disclosed in JP 2004-53799A, a camphorsulfonate anion, a fluorobenzene sulfonate anion, a difluorobenzene sulfonate anion, a trifluorobenzene sulfonate anion, a tetrafluorobenzene sulfonate anion, and a pentafluorobenzene sulfonate anion; phosphate anions such as an octylphosphate anion, a dodecylphosphate anion, an octadecylphosphate anion, a phenylphosphate anion, a nonylphenylphosphate anion, and a 2,2'-methylene-bis(4,6-di-t-butylphenyl)phosphonate anion; imide ions such as a bis(trifluoromethane sulfone)imide ion, a bis (pentafluoroethane sulfone)imide ion, a phthalimide ion, o-sulfobenzimide, a bis(heptafluoropropane sulfone)imide ion, a bis(nonafluorobutane sulfone)imide ion, a bis(undecafluoropentane sulfone)imide ion, a bis(pentadecafluoroheptane sulfone)imide ion, a bis(tridecafluorohexane sulfone)imide ion, a bis(heptadecafluorooctane sulfone imide) ion, a (trifluoromethane sulfone) (nonafluorobutane sulfone) imide ion, a (methane sulfone) (trifluoromethane sulfone) imide ion, and a cyclo-hexafluoropropane-1,3-bis(sulfonyl) imide anion; tetraarylborate anions such as a tetrakis (pentafluorophenyl)borate anion, a tetrakis(4-fluorophenyl) borate ion, a tetraphenylborate ion, borate anions disclosed in JP 2007-112854A, borate anions disclosed in JP H06-184170A, borate anions disclosed in JP 2002-526391T, and borate anions disclosed in WO2009/057600; carboxylate anions such as a benzoate anion, a trifluoroacetate anion, and a 2-oxo-2-phenylacetate anion; dithiocarbamate anions such as a N,N-diethyldithiocarbamate anion; and organic sulfonylmethide ions such as tris(trifluoromethane sulfonyl)methide and tris(methane sulfonyl)methide. Other examples include anions in which an alkylsulfonate ion, a fluoro-substituted alkylsulfonate ion, an alkylsulfone imide, or a fluoro-substituted alkylsulfone imide is substituted by an acryloyloxy group or a methacryloyloxy group, or substituted by an aliphatic cyclic alkyl group such as a norbornyl group or an adamantyl group. It is also possible to use, as necessary: a quencher anion having the function of de-exciting (quenching) an active molecule in an excited state; or a metallocene compound anion, such as ferrocene or ruthenocene, which has an anionic group such as a carboxyl group, a phosphonic acid group, or a sulfonic acid group on the cyclopentadienyl ring(s).

Among the examples of the m-valent anion represented by An$^{m-}$, halogen ions and inorganic halide anions are preferred.

Among the compounds of the co-adsorbent represented by the aforementioned general formula (1), compounds represented by general formula (2) below are preferred in terms of excellent improvability of photoelectric conversion efficiency.

[Chem. 2]

(2)

In the formula, R$^4$, R$^5$, R$^6$, and R$^7$ each represent a hydrogen atom, a halogen atom, a cyano group, a nitro group, an —OR$^2$ group, an —SR$^2$ group, or a hydrocarbon group that has a substituent or that is not substituted;

R$^6$ and R$^7$ may be connected together to form a ring; and Z, Z$^1$, R$^1$, R$^2$, R$^3$, An$^{m-}$, and p represent the same groups as in the general formula (1).

The hydrocarbon groups represented by R$^4$, R$^5$, R$^6$, and R$^7$ are the same as those described as examples of the hydrocarbon groups for replacing a hydrogen atom in the ring A or examples of the hydrocarbon groups represented by R$^2$ and R$^3$. As the groups represented by R$^4$, R$^5$, R$^6$, and R$^7$, a hydrogen atom or a hydrocarbon group that has a substituent or that is not substituted is preferred, and a hydrogen atom, or a phenyl group, a naphthyl group, or an alkyl group that has a substituent or that is not substituted is more preferred. As the alkyl group having a substituent or not substituted, C$_{1-20}$ alkyl groups, particularly C$_{1-5}$ alkyl groups, are preferred. In cases where the group has a substituent, the substituent is preferably a carboxylic acid group.

In cases where the dye (A) has an anchor group such as a sulfonic acid group, a phosphoric acid group, a phosphonic acid group, or a carboxylic acid group, the anchor group of the dye (A) and the group represented by R$^1$ in the co-adsorbent (B) may be the same, or may be different from one another.

Specific examples of the co-adsorbent (B) include the following compounds Nos. 1 to 22, but the co-adsorbent is not limited thereto. In the structural formulae, TfO$^-$ represents a trifluoromethane sulfonate anion, and Tf$_2$N$^-$ represents a bis(trifluoromethane sulfone)imide ion.

[Chem. 3]

No. 1

No. 2

No. 3

No. 4

No. 5

No. 6

-continued

No. 7

No. 8

No. 9

No. 10

No. 11

No. 12

-continued

No. 13

No. 14

No. 15

No. 16

No. 17

No. 18

[Chem. 3A]

No. 19                   No. 20

-continued

No. 21

No. 22

For example, the co-adsorbent (B) can be produced according to the following process.

Material 1 below (e.g. imidazole) and a halide (material 2) are heated under reflux and reacted, to obtain the intended co-adsorbent. It should be noted that the reaction equation below shows an example in which the pAn$^{m-}$ in the general formula (1) is a halogen anion (X$^-$).

[Chem. 3-2]

The molar ratio between the sensitizing dye (A) and the co-adsorbent (B), (A):(B), used in the carrier system of the present invention is from 1:99 to 99:1, and preferably from 5:95 to 600:40. Usually, in a dye-sensitized photoelectric conversion device using a co-adsorbent, if the amount of the sensitizing dye (A) absorbed is small with respect to that of the co-adsorbent (B), a sufficient sensitizing effect cannot be obtained, thus resulting in low photoelectric conversion efficiency. In contrast, the co-adsorbent (B) used in the present invention can achieve high photoelectric conversion efficiency compared to cases where only the sensitizing dye (A) is fixed, even when the amount of the co-adsorbent is about ten times (9:91) the amount of the sensitizing dye (A). This is made clear from the comparison in conversion efficiency between the Examples and Comparative Examples described further below (for example, from the comparison in conversion efficiency between Examples 1 to 3 and Comparative Example 1). In general, the sensitizing dye (A) is more expensive than the co-adsorbent (B); thus, the carrier system of the present invention using the co-adsorbent (B) is also highly cost-effective.

As methods for fixing the sensitizing dye (A) and the co-adsorbent (B) used in the carrier system of the invention, it is possible to employ one of various known methods, such as vapor-phase adsorption or liquid-phase adsorption. An example of liquid-phase adsorption is as follows: (A) and (B) are dissolved in a solvent, and the aforementioned carrier is immersed in the solution to cause the dye and co-adsorbent to be adsorbed onto the carrier. The carrier system of the invention can be obtained also by dissolving the sensitizing dye (A) and the co-adsorbent (B) in separate solvents, and immersing the carrier in the respective solutions.

In a process for producing a carrier system of the invention, first, a metal oxide semiconductor layer 12 having a porous structure is formed on the surface of a conductive layer 11B of a conductive substrate 11 by electrodeposition or firing. In cases of forming the semiconductor layer by electrodeposition, for example, an electrolytic bath containing a metal salt providing a metal oxide semiconductor material is heated to a predetermined temperature while bubbling with oxygen or air, the conductive substrate 11 is immersed therein, and a given voltage is applied between the substrate 11 and a counter electrode, to thereby deposit a metal oxide semiconductor material with a porous structure on the conductive layer 11B. The counter electrode may be moved appropriately in the electrolytic bath. In cases of forming the semiconductor layer by firing, for example, powder of a metal oxide semiconductor material is dispersed in a medium to prepare a metal oxide slurry, and the resulting slurry is applied to the conductive substrate 11, dried, and then fired, to form a porous structure. Then, a dye solution is prepared by dissolving, in an organic solvent, a dye 13 including both the sensitizing dye (A) and the co-adsorbent (B). The conductive substrate 11 having the metal oxide semiconductor layer 12 is immersed in the dye solution, to fix the dye 13 onto the metal oxide semiconductor layer 12.

The carrier system of the present invention is suited for use in a photoelectric conversion device described hereinafter. The carrier system is also useful for catalysts, toners, and so forth.

Next, the photoelectric conversion device according to the invention will be described.

The photoelectric conversion device of the invention is a dye-sensitized photoelectric conversion device having the same structure as conventional dye-sensitized photoelectric conversion devices, except that the sensitizing dye (A) as a dye and a co-adsorbent represented by the aforementioned general formula (1) as (B) are used. A typical example of the configuration of the photoelectric conversion device of the invention is described below with reference to FIGS. 1 and 2.

Figure 1:
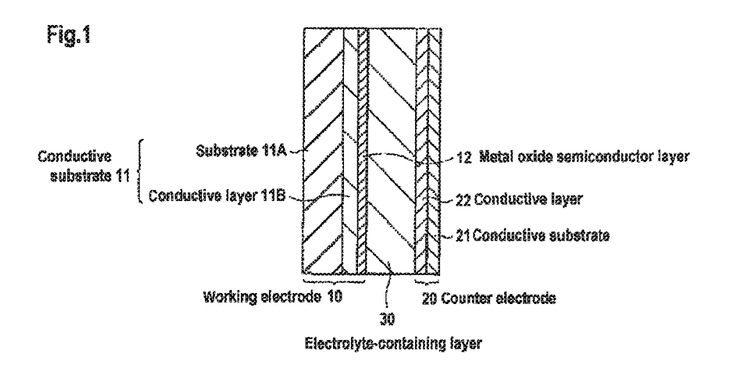
FIG. 1 schematically illustrates a cross-sectional structure of an example of a photoelectric conversion device according to the invention.
Figure 2:
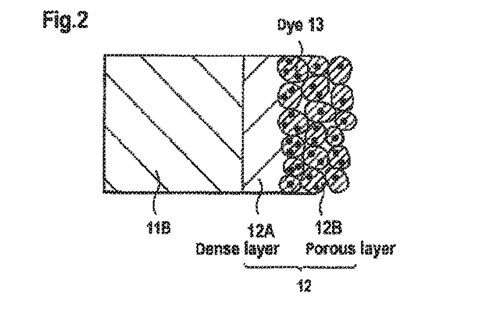
FIG. 2 is an enlarged view of an essential part of the photoelectric conversion device of the invention illustrated in FIG. 1.

FIG. 1 schematically illustrates a cross-sectional structure of an example of a photoelectric conversion device of the invention, and FIG. 2 illustrates an enlarged view of an essential part of the photoelectric conversion device illustrated in FIG. 1. The photoelectric conversion device of FIGS. 1 and 2 is a principal part of a dye-sensitized solar cell. The photoelectric conversion device includes a working electrode 10 and a counter electrode 20 facing each other with an electrolyte-containing layer 30 interposed therebetween. At least one of the working electrode 10 and the counter electrode 20 is a light-transmissive electrode.

The working electrode 10 has, for example, a conductive substrate 11, a metal oxide semiconductor layer 12 provided on one surface of the substrate 11 (on the surface facing the counter electrode 20), and a dye 13 carried on the metal oxide semiconductor layer 12. In the photoelectric conversion device of the invention, the dye 13 includes the sensitizing dye (A) and the co-adsorbent (B), and the carrier system of the invention is a composite system composed of the dye 13 and the metal oxide semiconductor layer 12 carrying the dye.

The working electrode 10 functions as a negative electrode to an outer circuit. The conductive substrate 11 is, for example, composed of an insulating substrate 11A and a conductive layer 11B provided on the surface of the insulating substrate 11A.

Examples of the material of the substrate 11A include insulating materials, such as glass and plastics. Plastics are used, for example, in the form of transparent polymer film. Examples of plastics for forming a transparent polymer film include tetraacetyl cellulose (TAC), polyethylene terephthalate (PET), polyethylene naphthalate (PEN), syndiotactic polystyrene (SPS), polyphenylene sulfide (PPS), polycarbonate (PC), polyarylate (PAR), polysulfone (PSF), polyester sulfone (PES), polyetherimide (PEI), cyclic polyolefins, and brominated phenoxy resins.

The conductive layer 11B is, for example: a thin film of an electroconductive metal oxide, such as indium oxide, tin oxide, indium-tin complex oxide (ITO), or fluorine-doped tin oxide (FTO or $F-SnO_2$); a thin film or mesh of a metal, such as gold (Au), silver (Ag), or platinum (Pt); or an electroconductive polymer film or mesh.

It should be noted that the conductive substrate 11 may be, for example, a single-layer structure made of an electroconductive material. In this case, examples of the material of the conductive substrate 11 include: electroconductive metal oxides, such as indium oxide, tin oxide, indium-tin complex oxide, and fluorine-doped tin oxide; metals, such as gold, silver, and platinum; and electroconductive polymers.

The metal oxide semiconductor layer 12 is a carrier carrying the dye 13, and has, for example, a porous structure as illustrated in FIG. 2. The metal oxide semiconductor layer 12 is formed of a dense layer 12A and a porous layer 12B. The dense layer 12A is formed on the interface with the conductive substrate 11 and is preferably dense and less-porous, and more preferably filmy. The porous layer 12B is formed on the surface in contact with the electrolyte-containing layer 30, and preferably has a structure with many voids and a large surface area, and more preferably a structure composed of porous particles adhering to one another. The metal oxide semiconductor layer 12 may have, for example, a single-layer structure of film form. In the invention, "carry (fix)" refers to a state in which the dye 13 is bonded or adsorbed to the porous layer 12B chemically, physically, or electrically.

Examples of the material (metal oxide semiconductor material) contained in the metal oxide semiconductor layer 12 include titanium oxide, zinc oxide, tin oxide, niobium oxide, indium oxide, zirconium oxide, tantalum oxide, vanadium oxide, yttrium oxide, aluminum oxide, and magnesium oxide. Inter alia, as for the metal oxide semiconductor material, titanium oxide and zinc oxide are preferred, for they provide high conversion efficiency. These metal oxide semiconductor materials may be used singly, or two or more thereof may be used in combinations (in the form, e.g., of mixture, mixed crystal, solid solution, or one covering the surface of another). For example, titanium oxide and zinc oxide may be used in combination.

Examples of methods for forming the metal oxide semiconductor layer 12 having a porous structure include electrodeposition, coating, and firing. Electrodeposition to form the metal oxide semiconductor layer 12 is carried out by immersing the conductive substrate 11 in an electrolytic bath containing a particulate metal oxide semiconductor material to cause the particles to adhere to the conductive layer 11B of the conductive substrate 11, thereby making the metal oxide semiconductor material precipitate thereon. In cases of forming the metal oxide semiconductor layer 12 by coating, a dispersion of a particulate metal oxide semiconductor material (metal oxide slurry) is applied onto the conductive substrate 11 and then dried to remove the dispersion medium. In cases of forming the metal oxide semiconductor layer 12 by sintering, the metal oxide slurry is applied onto the conductive substrate 11 and dried in the same manner as in the coating method, followed by firing. Among the above, forming the metal oxide semiconductor layer 12 by electrodeposition or coating is advantageous in that a less heat-resistant plastic material or polymer film material is allowed to be used as the substrate 11A, thereby making it possible to provide a highly flexible electrode.

The metal oxide semiconductor layer 12 may be treated with an organic base, a urea derivative, or a cyclic saccharide chain. Examples of the organic base include diarylamines, triarylamines, pyridine, 4-t-butylpyridine, polyvinylpyridine, quinoline, piperidine, and amidines. The treatment may be effected either before or after the hereinafter described adsorption of the dye 13. The treatment can be carried out by immersion. When a solid treating agent is used, the treating agent can be dissolved in an organic solvent to prepare a solution, which is used for immersion.

The dye 13 is, for example, adsorbed onto the metal oxide semiconductor layer 12. The dye 13 includes one or more dyes (sensitizing dyes) capable of being excited on absorbing light to inject electrons to the metal oxide semiconductor layer 12. In the photoelectric conversion device of the invention, a mixture including the sensitizing dye (A) and the co-adsorbent (B) corresponds to the dye 13. When the sensitizing dye (A) and the co-adsorbent (B) are used as the dye 13, the dye 13 as a whole achieves an increased rate of electron injection into the metal oxide semiconductor layer 12 per unit quantity of incident light, thereby improving conversion efficiency.

The dye 13 needs to include the sensitizing dye (A) and the co-adsorbent (B), and may include other dyes. Examples of other dyes include dyes that contain no anchor group.

The dye 13 may contain, in addition to the above described dyes, one or more additives, such as dye association inhibitors which suppress the association of compounds in the dyes, with specific examples thereof including cholic acid compounds represented by chemical formula (14) below. These compounds may be used singly, or a plurality thereof may be used in a form of a mixture.

[Chem. 4]

(14)

In the formula, R91 represents an alkyl group having an acidic group or an alkoxysilyl group; R92 represents a group bonded to any of carbon atoms constructing the steroid skeleton in the chemical formula, and is a hydroxyl group, a halogen group, an alkyl group, an alkoxy group, an aryl group, a heterocyclic group, an acyl group, an acyloxy group, an oxycarbonyl group, an oxo group, an acidic group, an alkoxysilyl group, or a derivative thereof; a plurality of R92 may be the same or different; t represents an integer of 1 to 5; and the bond between the carbon atoms constructing the steroid skeleton in the chemical formula may be either a single bond or a double bond.

The counter electrode 20 is composed, e.g., of a conductive substrate 21 and a conductive layer 22 provided thereon, and functions as a positive electrode to an external circuit. Examples of materials for making the conductive substrate 21 include those described as materials for making the substrate 11A of the conductive substrate 11 of the working electrode 10. The conductive layer 22 includes, for example, one or more electroconductive materials and, if necessary, a binder.

Examples of the electroconductive material for use in the conductive layer 22 include: metals, such as platinum, gold, silver, copper (Cu), rhodium (Rh), ruthenium (Ru), aluminum (Al), magnesium (Mg), and indium (In); carbon (C); and electroconductive polymers. Examples of the binder for use in the conductive layer 22 include acrylic resins, polyester resins, phenol resins, epoxy resins, cellulose, melamine resins, fluoroelastomers, and polyimide resins. The counter electrode 20 may have, for example, a single-layer structure formed of the conductive layer 22.

The electrolyte-containing layer 30 includes, for example, a redox electrolyte containing an oxidation-reduction couple. Examples of the redox electrolyte include an $I^-/I_3^-$ couple, a $Br^-/Br_3^-$ couple, a quinone/hydroquinone couple, a cobalt complex, and a nitroxy radical compound. Specifically, the redox electrolyte is exemplified by a halide/halogen couple, such as an iodide/iodine couple or a bromide/bromine couple. Examples of the halide include lithium halides, cesium halides, quaternary alkylammonium halides, imidazolium halides, thiazolium halides, oxazolium halides, quinolinium halides, and pyridinium halides. Specifically, examples of the iodide include: lithium iodide; cesium iodide; quaternary alkylammonium iodides, such as tetraethylammonium iodide, tetrapropylammonium iodide, tetrabutylammonium iodide, tetrapentylammonium iodide, tetrahexylammonium iodide, tetraheptylammonium iodide, and trimethylphenylammonium iodide; imidazolium iodides, such as 3-methylimidazolium iodide and 1-propyl-2,3-dimethylimidazolium iodide; thiazolium iodides, such as 3-ethyl-2-methyl-2-thiazolium iodide, 3-ethyl-5-(2-hydroxyethyl)-4-methylthiazolium iodide, and 3-ethyl-2-methylbenzothiazolium iodide; oxazolium iodides, such as 3-ethyl-2-methylbenzoxazolium iodide; quinolinium iodides, such as 1-ethyl-2-methylquinolinium iodide; and pyridinium iodides. Examples of the bromides include quaternary alkylammonium bromides. Of the halide/halogen couples, preferred are couples of at least one of the above listed iodides and iodine.

The redox electrolyte may be, for example, a combination of an ionic liquid and a halogen. In this case, the redox electrolyte may further contain the aforementioned halide etc. Examples of the ionic liquid include those usable in electric batteries and solar cells, such as those disclosed in "Inorg. Chem." 1996, 35, pp. 1168-1178, "Electrochemistry" 2002, 2, pp. 130-136, JP H09-507334T, and JP H08-259543A. As for the ionic liquid, preferred are salts whose melting point is below room temperature (25° C.) or salts whose melting point is higher than room temperature but which are liquefied at room temperature on dissolving with other fused salts. Specific examples of the ionic liquids are anions and cations described below.

Examples of cations of ionic liquids are ammonium, imidazolium, oxazolium, thiazolium, oxadiazolium, triazolium, pyrrolidinium, pyridinium, piperidinium, pyrazolium, pyrimidinium, pyradinium, triazinium, phosphonium, sulfonium, carbazolium, indolium, and derivatives thereof. They may be used singly or in a form of a mixture of two or more thereof. Specific examples include 1-methyl-3-propylimidazolium, 1-butyl-3-methylimidazolium, 1,2-dimethyl-3-propylimidazolium, and 1-ethyl-3-methylimidazolium.

Examples of anions of ionic liquids include: metal chloride ions, e.g., $AlCl_4^-$ and $Al_2Cl_7^-$; fluorine-containing ions, such as $PF_6^-$, $BF_4^-$, $CF_3SO_3^-$, $N(CF_3SO_2)_2^-$, $F(HF)_n^-$, and $CF_3COO^-$; fluorine-free compound ions, such as $NO_3^-$, $CH_3COO^-$, $C_6H_{11}COO^-$, $CH_3OSO_3^-$, $CH_3OSO_2^-$, $CH_3SO_3^-$, $CH_3SO_2^-$, $(CH_3O)_2PO_2^-$, $N(CN)_2^-$, and $SCN^-$; and halide ions, such as iodide ions and bromide ions. These anions may be used singly or in a form of a mixture of two or more thereof. Preferred among these anions of ionic liquids are iodide ions.

For the electrolyte-containing layer 30, it is possible to use a liquid electrolyte (electrolyte solution) prepared by dissolving the aforementioned redox electrolyte in a solvent, or use a solid polymer electrolyte, in which an electrolyte solution is held in a polymer matrix. The electrolyte-containing layer 30 may also be a pseudo-solid (pasty) electrolyte containing a mixture of an electrolyte solution and a particulate carbon material, such as carbon black. The pseudo-solid electrolyte containing a carbon material does not need to contain a halogen simple substance in the electrolyte because the carbon material functions to catalyze the oxidation-reduction reaction. The redox electrolyte may contain one or more organic solvents capable of dissolving the aforementioned halide, ionic liquid, or the like. Examples of such organic solvents include electrochemically inert solvents, such as acetonitrile, tetrahydrofuran, propionitrile, butyronitrile, methoxyacetonitrile, 3-methoxypropionitrile, valeronitrile, dimethyl carbonate, ethylmethyl carbonate, ethylene carbonate, propylene carbonate, N-methylpyrrolidone, pentanol, quinoline, N,N-dimethylformamide, γ-butyrolactone, dimethyl sulfoxide, and 1,4-dioxane.

For the purpose of improving power generation efficiency, durability, and the like of the photoelectric conversion device, the electrolyte-containing layer 30 may contain an acyclic saccharide (see JP 2005-093313A), a pyridine compound (see JP 2003-331936A), a urea derivative (see JP 2003-168493A), a sheet clay mineral (see JP 2007-531206T), dibenzylidene D-sorbitol, a cholesterol derivative, an amino acid derivative, a trans-(1R,2R)-1,2-cyclohexanediamine alkyamide derivative, an alkylurea derivative, N-octyl-D-gluconamide benzoate, a double-headed amino acid derivative, a quaternary ammonium derivative, or the like.

When light (sunlight or ultraviolet, visible, or near-infrared light equal to sunlight) is incident on the dye 13 carried in the working electrode 10 in the present photoelectric conversion device, the dye 13 absorbs the light, and the thus excited dye 13 injects electrons into the metal oxide semiconductor layer 12. The electrons move to the adjacent conductive layer 11B, pass through an external circuit, and reach the counter electrode 20. On the other hand, the electrolyte in the electrolyte-containing layer 30 is oxidized to return (reduce) the dye 13, which has been oxidized with the movement of electrons, to its ground state. The thus-oxidized electrolyte is reduced upon receipt of the electrons having reached the counter electrode 20. In this way, the electron movement between the working electrode 10 and the counter electrode 20 and the associated oxidation-reduction reaction in the electrolyte-containing layer 30 are repeated, whereby electrons move continuously to steadily perform photoelectric conversion.

The photoelectric conversion device of the invention can be produced, for example, as follows.

First, a working electrode 10 is prepared. First of all, a metal oxide semiconductor layer 12 having a porous structure is formed on the surface of the conductive layer 11B of the conductive substrate 11 by electrodeposition or firing. In cases of employing electrodeposition, for example, an electrolytic bath containing a metal salt providing a metal oxide semiconductor material is heated to a predetermined temperature while bubbling with oxygen or air, the conductive substrate 11 is immersed therein, and a given voltage is applied between the substrate 11 and a counter electrode, thereby to deposit a metal oxide semiconductor material so as to have a porous structure on the conductive layer 11B. On this occasion, the counter electrode may be moved appropriately in the electrolytic bath. In cases of employing firing, for example, powder of a metal oxide semiconductor material is dispersed in a medium to prepare a metal oxide slurry, and the resulting slurry is applied to the conductive substrate 11, dried, and then fired to form a porous structure. Then, a dye solution is prepared by dissolving, in an organic solvent, a dye 13 including the sensitizing dye (A) and the co-adsorbent (B). The conductive substrate 11 having the metal oxide semiconductor layer 12 formed thereon is immersed in the dye solution to fix the dye 13 onto the metal oxide semiconductor layer 12.

The concentration of the sensitizing dye (A) in the dye solution is preferably from 0.01 to 1 mM, and more preferably from 0.05 to 0.5 mM. The concentration of the co-adsorbent (B) in the dye solution is preferably from 0.01 to 20 mM, and more preferably from 0.05 to 10 mM. The organic solvent used to prepare the dye solution is not particularly limited as long as it is capable of dissolving the sensitizing dye (A) and the co-adsorbent (B), and specific examples include: hydrocarbons, such as toluene, benzene, and xylene; alcohols, such as methanol, ethanol, and t-butanol; ether alcohols, such as methyl cellosolve, ethyl cellosolve, butyl cellosolve, and butyl diglycol; ketones, such as acetone, methyl ethyl ketone, methyl isobutyl ketone, cyclohexanone, and diacetone alcohol; esters, such as ethyl acetate, butyl acetate, and methoxyethyl acetate; acrylic esters, such as ethyl acrylate and butyl acrylate; fluoroalcohols, such as 2,2,3,3-tetrafluoropropanol; chlorinated hydrocarbons, such as methylene dichloride, dichloroethane, and chloroform; acetonitrile; and tetrahydrofuran. These organic solvents may also be used in any combination thereof. Preferred solvents are toluene, acetonitrile, and alcohols, with acetonitrile and alcohols being more preferred.

A conductive layer 22 is then formed on one surface of a conductive substrate 21 to prepare a counter electrode 20. The conductive layer 22 can be formed by, for example, sputtering an electroconductive material.

The working electrode 10 and the counter electrode 20 are assembled such that the surface of the working electrode 10 carrying the dye 13 and the surface of the counter electrode 20 provided with the conductive layer 22 face each other with a predetermined space therebetween, and the entire assembly is sealed with a sealant or the like as a spacer (not illustrated) therebetween, for example, while leaving an inlet for injecting an electrolyte. Subsequently, an electrolyte is injected through the inlet into the space between the working electrode 10 and the counter electrode 20, followed by sealing the inlet, to form the electrolyte-containing layer 30. In this way, the photoelectric conversion device illustrated in FIGS. 1 and 2 is completed.

While the photoelectric conversion device has been described with particular reference to the configuration in which the electrolyte-containing layer 30 is provided between the working electrode 10 and the counter electrode 20, the electrolyte-containing layer 30 may be replaced with a solid charge transfer layer. In that case, the solid charge transfer layer includes, for example, a material in which carrier transfer through the solid is relevant to electric conduction. Such a material is preferably an electron transport material or a hole transport material.

The hole transport material is preferably, for example, an aromatic amine or a triphenylene derivative, and examples thereof include organic electroconductive polymers, such as oligothiophene compounds, polypyrrole, polyacetylene or its derivatives, poly(p-phenylene) or its derivatives, poly(p-phenylenevinylene) or its derivatives, polythienylenevinylene or its derivatives, polythiophene or its derivatives, polyaniline or its derivatives, polytoluidine or its derivatives, and the like.

A p-type inorganic compound semiconductor, for example, may be used as the hole transport material. The p-type inorganic compound semiconductor preferably has a band gap of 2 eV or greater, and more preferably 2.5 eV or greater. The ionization potential of the p-type inorganic compound semiconductor must be smaller than that of the working electrode 10 in order to secure the condition for reducing the positive holes of the dye. The preferred range of the ionization potential of the p-type inorganic compound semiconductor varies depending on the dye used, but is preferably from 4.5 to 5.5 eV inclusive, and more preferably from 4.7 to 5.3 eV inclusive.

Examples of the p-type inorganic compound semiconductor include compound semiconductors containing monovalent copper. Examples of compound semiconductors containing monovalent copper include CuI, CuSCN, CuInSe$_2$, Cu(In,Ga)Se$_2$, CuGaSe$_2$, Cu$_2$O, CuS, CuGaS$_2$, CuInS$_2$, and CuAlSe$_2$. Other examples of the p-type inorganic compound semiconductor include GaP, NiO, CoO, FeO, Bi$_2$O$_3$, MoO$_2$, and Cr$_2$O$_3$.

As for the method for forming the solid charge transfer layer, the solid charge transfer layer may, for example, be formed directly on the working electrode 10, and then the counter electrode 20 may be formed thereon.

The hole transport material including the organic electroconductive polymer may be introduced into the inside of the electrode by, for example, vacuum deposition, casting, coating, spin coating, dipping, electrolytic polymerization, or photo-induced electrolytic polymerization. Also for inorganic solid compounds, the hole transport material may be introduced into the inside of the electrode by, for example, casting, coating, spin coating, dipping, or electroplating. It is preferred that part of the thus-formed solid charge transport layer (particularly a layer containing the hole transport material) partially penetrate into the voids of the porous structure of the metal oxide semiconductor layer 12 to come into direct contact with the metal oxide semiconductor material.

The combination of the sensitizing dye (A) and the co-adsorbent (B) can also improve conversion efficiency of a photoelectric conversion device that has a solid charge transfer layer instead of the electrolyte-containing layer 30, just like in the case of a photoelectric conversion device having the electrolyte-containing layer 30.

The use of the photoelectric conversion device of the invention is not limited to the aforementioned solar cell, and the photoelectric conversion device finds other uses, such as photosensors.

EXAMPLES

The present invention will be described in more detail below by way of synthesis examples for synthesizing co-adsorbents (B) used in the present invention, and working examples of carrier systems (working electrodes) of the present invention and comparative examples. The present invention, however, is not limited by these examples.

The aforementioned Compound No. 1 was synthesized by the following Synthesis Example 1.

Synthesis Example 1: Synthesis of Compound No. 1

1-Methylimidazole (Tokyo Chemical Industry Co., Ltd.) (5.07 mmol), 11-iodoundecanoic acid (6.09 mmol), and tetrahydrofuran (6 g) were placed in a reaction flask and were reacted by heating under reflux for 3 hours. Then, hexane was added to the reaction flask, and the precipitated crystals were filtered to obtain 1.33 g of a white solid (yield: 67%). It was verified by $^1$H-NMR and IR that the obtained solid was Compound No. 1. Data are shown in Tables 1 to 3.

Synthesis Examples 2 to 8: Synthesis of Compounds Nos. 2 to 4 and 19 to 22

Compounds Nos. 2 to 4 each were synthesized according to the same manner as in Synthesis Example 1, except that an imidazole compound and a haloalkyl carboxylic acid corresponding to the respective target compound were used. Compounds Nos. 19 to 22 were synthesized by subjecting Compound No. 1 to a salt exchange reaction with $KPF_6$, potassium trifluoromethanesulfonate, sodium tetrafluoroborate, and potassium bis(trifluoromethanesulfonyl)imide, respectively. Data are shown in Tables 1 to 3. It should be noted that the yield in each of the Synthesis Examples 5 to 8 is the yield for the salt exchange reaction. Table 4 shows data of $^{19}$F-NMR.

TABLE 1

|  | Appearance | Yield (%) | Synthesized compound |
|---|---|---|---|
| Synthesis Example 1 | White solid | 67 | No. 1 |
| Synthesis Example 2 | White solid | 48 | No. 2 |
| Synthesis Example 3 | White solid | 65 | No. 3 |
| Synthesis Example 4 | White solid | 11 | No. 4 |
| Synthesis Example 5 | White solid | 98 | No. 19 |
| Synthesis Example 6 | White solid | 95 | No. 20 |
| Synthesis Example 7 | White solid | 98 | No. 21 |
| Synthesis Example 8 | White solid | 92 | No. 22 |

TABLE 2

| | $^1$H-NMR |
|---|---|
| Synthesis Example 1 (d6-DMSO) | 9.09(s, 1H), 7.75(s, 1H), 7.68(s, 1H), 4.13(t, 2H), 3.83(s, 3H), 2.19(t, 2H), 1.76(m, 2H), 1.46(m, 2H), 1.23 (s, 12H) |
| Synthesis Example 2 (d6-DMSO) | 11.94(s, 1H), 9.18(s, 1H), 7.75(d, 2H), 4.14(t, 2H), 3.84(s, 3H), 2.17(t, 2H), 1.76(s, 2H), 1.46(t, 2H), 1.23 (s, 12H) |
| Synthesis Example 3 (d6-DMSO) | 9.18(s, 1H), 7.79(s, 2H), 4.17-4.14(m, 4H), 2.17(t, 2 H), 1.81-1.73(m, 4H), 1.46(t, 2H), 1.23(s, 14H), 0.80 (t, 3H) |
| Synthesis Example 4 (d6-DMSO) | 9.11(s, 1H), 7.76(s, 1H), 7.67(s, 1H), 4.14(t, 2H), 3.83(s, 5H), 3.66(s, 2H), 2.14(t, 2H), 1.76(m, 2H), 1.43 (t, 2H), 1.21(s, 12H) |
| Synthesis Example 5 (d6-DMSO) | 9.03(s, 1H), 7.70(s, 1H), 7.64(s, 1H), 4.09(t, 2H), 3.82(s, 3H), 2.16(t, 2H), 1.76(m, 2H), 1.46(m, 2H), 1.23 (s, 12H) |
| Synthesis Example 6 (d6-DMSO) | 9.02(s, 1H), 7.70(s, 1H), 7.63(s, 1H), 4.08(t, 2H), 3.82(s, 3H), 2.15(t, 2H), 1.75(m, 2H), 1.46(m, 2H), 1.23 (s, 12H) |
| Synthesis Example 7 (d6-DMSO) | 9.11(s, 1H), 7.73(s, 1H), 7.70(s, 1H), 4.11(t, 2H), 3.83(s, 3H), 2.16(t, 2H), 1.76(m, 2H), 1.46(m, 2H), 1.23 (s, 12H) |
| Synthesis Example 8 (d6-DMSO) | 9.02(s, 1H), 7.74(s, 1H), 7.63(s, 1H), 4.09(t, 2H), 3.83(s, 3H), 2.15(t, 2H), 1.75(m, 2H), 1.46(m, 2H), 1.23 (s, 12H) |

TABLE 3

| | <IR; ATR method> |
|---|---|
| | /cm$^{-1}$ |
| Synthesis Example 1 | 3089, 2918, 2850, 1716, 1569, 1560, 1569, 1560, 1469, 1399, 1238, 1208, 1193, 1165, 1097, 1069 |
| Synthesis Example 2 | 3111, 3063, 2915, 2849, 1708, 1568, 1558, 1460, 1400, 1263, 1235, 1204, 1177, 1161, 1108, 1087, 1059, 1017 |
| Synthesis Example 3 | 3423, 3074, 2922, 2850, 1716, 1560, 1462, 1399, 1377, 1356, 1334, 1304, 1272, 1241, 1203, 1189, 1162, 1103 |
| Synthesis Example 4 | 3150, 3110, 2998, 2917, 2846, 1722, 1650, 1609, 1577, 1459, 1411, 1331, 1292, 1213, 1190, 1176, 1072, 1039, |

TABLE 4

| | $^{19}$F-NMR (the medium for measurement was CDCl$_3$) |
|---|---|
| Synthesis Example 5 | −70.92 |
| Synthesis Example 6 | −78.90 |
| Synthesis Example 7 | −151.51 |
| Synthesis Example 8 | −78.20 |

Production of Titanium Oxide Carrier (Conductive Substrate 11):

A conductive substrate 11 made of an electroconductive glass substrate (F—$SnO_2$) measuring 2.0 cm in length, 1.5 cm in width, and 1.1 mm in thickness was provided. A 70-μm-thick masking tape was stuck on the conductive substrate 11 to surround a 0.5×0.5 cm square region, and 3 $cm^3$ of a metal oxide slurry was applied to the square region to become a uniform thickness and dried. A titanium oxide slurry ($TiO_2$; Ti-Nanoxide D manufactured by Solaronix) was used as the metal oxide slurry. After removing the masking tape on the conductive substrate 11, the substrate was fired in an electric oven at 450° C. to form a metal oxide semiconductor layer 12 with a thickness of about 5 μm.

Production of Zinc Oxide Carrier (Working Electrode) (Conductive Substrate 11):

In the same manner as that for the aforementioned titanium oxide carrier, a conductive substrate 11 including a zinc oxide carrier was produced, except that a zinc oxide powder (average particle diameter: 20 nm; FINEX-50 manufactured by Sakai Chemical Industry Co., Ltd.) was used instead of the aforementioned titanium oxide powder to form a metal slurry.

Examples and Comparative Examples

The compounds shown in Table 5 as sensitizing dyes (A) and co-adsorbents (B) were dissolved in ethanol at predetermined concentrations to prepare the respective dye solutions. Then, the titanium oxide carrier or the zinc oxide carrier produced as above was immersed in the respective dye solutions for two hours to thereby prepare respective working electrodes 10.

Production of Photoelectric Conversion Device and Evaluation of Conversion Efficiency:

A photoelectric conversion device as illustrated in FIG. 1 was prepared by the following manner: the prepared working electrode 10 is arranged so as to face a counter electrode 20 prepared by coating an ITO electrode (manufactured by Nishinoda Denko Co., Ltd.), which serves as a conductive substrate 21, with graphite particulates (conductive layer 22) with a spacer (63 μm) disposed therebetween such that an electrolyte-containing layer 30 was to be formed therebetween; the stack was fixed with a clip; and a predetermined electrolyte solution 1, electrolyte solution 2 or electrolyte solution 3 was introduced into the electrolyte-containing layer 30. The upper part of the cell was covered with a mask having an opening of 1 $cm^2$, and the photoelectric conversion efficiency η (%) was measured with a solar simulator at AM-1.5G, 100 $mW/cm^2$.

TABLE 5

| | (A) Sensitizing dye | (B) Co-adsorbent | Carrier | Electrolyte solution | η (%) |
|---|---|---|---|---|---|
| Example 1 | Dye 1 (0.3 mM) | No. 1 (3 mM) | $TiO_2$ | Electrolyte solution 1 | 2.62 |
| Example 2 | Dye 1 (0.3 mM) | No. 2 (3 mM) | $TiO_2$ | Electrolyte solution 1 | 2.56 |
| Example 3 | Dye 1 (0.3 mM) | No. 3 (3 mM) | $TiO_2$ | Electrolyte solution 1 | 2.73 |
| Example 4 | Dye 1 (0.3 mM) | No. 4 (0.3 mM) | $TiO_2$ | Electrolyte solution 1 | 2.29 |
| Example 5 | Dye 1 (0.3 mM) | No. 19 (3 mM) | $TiO_2$ | Electrolyte solution 1 | 2.5 |
| Example 6 | Dye 1 (0.3 mM) | No. 20 (3 mM) | $TiO_2$ | Electrolyte solution 1 | 2.32 |
| Example 7 | Dye 1 (0.3 mM) | No. 21 (3 mM) | $TiO_2$ | Electrolyte solution 1 | 2.46 |
| Example 8 | Dye 1 (0.3 mM) | No. 22 (3 mM) | $TiO_2$ | Electrolyte solution 1 | 2.51 |
| Comp. Example 1 | Dye 1 (0.3 mM) | — | $TiO_2$ | Electrolyte solution 1 | 1.79 |
| Example 9 | Dye 2 (0.3 mM) | No. 1 (3 mM) | $TiO_2$ | Electrolyte solution 1 | 2.88 |
| Comp. Example 2 | Dye 2 (0.3 mM) | — | $TiO_2$ | Electrolyte solution 1 | 2.34 |
| Example 10 | Dye 3 (0.3 mM) | No. 1 (3 mM) | $TiO_2$ | Electrolyte solution 1 | 1.92 |
| Comp. Example 3 | Dye 3 (0.3 mM) | — | $TiO_2$ | Electrolyte solution 1 | 1.8 |
| Example 11 | Dye 4 (0.3 mM) | No. 1 (3 mM) | $TiO_2$ | Electrolyte solution 1 | 1.77 |
| Comp. Example 4 | Dye 4 (0.3 mM) | — | $TiO_2$ | Electrolyte solution 1 | 1.51 |
| Example 12 | Dye 2 (0.3 mM) | No. 1 (3 mM) | $TiO_2$ | Electrolyte solution 2 | 4.74 |
| Example 13 | Dye 2 (0.3 mM) | No. 2 (3 mM) | $TiO_2$ | Electrolyte solution 2 | 4.73 |
| Comp. Example 5 | Dye 2 (0.3 mM) | Comparative co-adsorbent (3 mM) | $TiO_2$ | Electrolyte solution 2 | 3.97 |
| Comp. Example 6 | Dye 2 (0.3 mM) | — | $TiO_2$ | Electrolyte solution 2 | 3.78 |
| Example 14 | Dye 1 (0.3 mM) | No. 2 (3 mM) | ZnO | Electrolyte solution 2 | 1.91 |
| Comp. Example 7 | Dye 1 (0.3 mM) | — | ZnO | Electrolyte solution 2 | 1.68 |
| Example 15 | Dye 1 (0.3 mM) | No. 19 (3 mM) | $TiO_2$ | Electrolyte solution 3 | 3.17 |
| Comp. Example 8 | Dye 1 (0.3 mM) | — | $TiO_2$ | Electrolyte solution 3 | 2.81 |

In Table 5 above, the lower row in each of (A) and (B) indicates the concentration of (A) and (B) in the dye solution. The composition of each of electrolyte solutions 1 to 3 in Table 5 was as follows.

Composition of Electrolyte Solutions:

Electrolyte solution 1: A solution obtained by mixing iodine (0.05 M) and lithium iodide (0.5 M) with acetonitrile at predetermined concentrations.

Electrolyte solution 2: A solution obtained by mixing iodine (0.05 M), lithium iodide (0.5 M), and 4-tert-butylpyridine (0.5 M) with acetonitrile at predetermined concentrations.

Electrolyte solution 3: A solution obtained by mixing $[Co(bpy)_3](PF_6)_2$ (0.22 M) and $[Co(bpy)_3](PF_6)_3$ (0.022 M) with acetonitrile at predetermined concentrations.

[Chem. 5]

Dye 1

Dye 2

Dye 3

Dye 4

Comparative co-adsorbent

[Co(bpy)₃](PF₆)$_{2or3}$

From the Examples and Comparative Examples, it is clear that the carrier system of the present invention is improved in conversion efficiency by employing, in combination, the sensitizing dye (A) and the co-adsorbent (B) represented by the aforementioned general formula (1).

From the above results, it is clear that the use of the carrier system of the present invention as an electrode for a photoelectric conversion device achieves high conversion efficiency, and thus the present carrier system is useful.

REFERENCE SIGNS LIST

10: Working electrode
11: Conductive substrate
11A: Substrate
11B: Conductive layer
12: Metal oxide semiconductor layer
12A: Dense layer
12B: Porous layer
13: Dye
20: Counter electrode
21: Conductive substrate
22: Conductive layer
30: Electrolyte-containing layer

The invention claimed is:
1. A carrier system comprising a carrier, a dye (A) and a co-adsorbent (B), wherein said dye (A) and co-adsorbent (B) are bonded or adsorbed to said carrier, and said co-adsorbent (B) is represented by general formula (1) below:

(1)

wherein, ring A represents a 5- or 6-membered heterocycle and may further be fused with another cyclic group;
a hydrogen atom in the ring A may be replaced by a halogen atom, a cyano group, a nitro group, an —$OR^2$ group, an —$SR^2$ group, or a hydrocarbon group that has a substituent or that is not substituted;
Z represents a divalent aliphatic hydrocarbon group that is interrupted zero to three times by —O—, —S—, —CO—, —COO—, —OCO—, —$CONR^3$—, —$NR^3CO$—, or —$Z^1$—;
$Z^1$ represents a divalent aromatic group;
$R^1$ represents a group selected from a carboxylic acid group, a sulfonic acid group, a phosphoric acid group, and a phosphonic acid group;
$R^2$ and $R^3$ each independently represent a hydrogen atom or a hydrocarbon group that has a substituent or that is not substituted;
$An^{m-}$ represents an m-valent anion;
m represents an integer of 1 or 2; and
p represents a coefficient for keeping the electrical charge neutral.

2. The carrier system according to claim 1, wherein the co-adsorbent (B) is represented by general formula (2) below:

(2)

wherein, $R^4$, $R^5$, $R^6$, and $R^7$ each represent a hydrogen atom, a halogen atom, a cyano group, a nitro group, an —$OR^2$ group, an —$SR^2$ group, or a hydrocarbon group that has a substituent or that is not substituted;
$R^6$ and $R^7$ may be connected together to form a ring; and
Z, $Z^1$, $R^1$, $R^2$, $R^3$, $An^{m-}$, and p represent the same groups as in the general formula (1).

3. The carrier system according to claim 1, wherein the divalent aliphatic hydrocarbon group represented by Z has 7 to 15 carbon atoms.

4. A photoelectric conversion device comprising an electrode including the carrier system according to claim 1.

5. A dye-sensitized solar cell comprising the photoelectric conversion device according to claim 4.

6. The carrier system according to claim 2, wherein the divalent aliphatic hydrocarbon group represented by Z has 7 to 15 carbon atoms.

7. A photoelectric conversion device comprising an electrode including the carrier system according to claim 2.

8. A photoelectric conversion device comprising an electrode including the carrier system according to claim 3.

9. A photoelectric conversion device comprising an electrode including the carrier system according to claim 6.

10. The carrier system according to claim 1, wherein the carrier comprises a porous layer, and the sensitizing dye (A) and the co-adsorbent (B) are bonded or adsorbed to the porous layer chemically, physically, or electrically.

11. The carrier system according to claim 1, wherein the molar ratio between the sensitizing dye (A) and the co-adsorbent (B), (A):(B), used in the carrier system is from 1:99 to 99:1.

12. The carrier system according to claim 1, wherein the molar ratio between the sensitizing dye (A) and the co-adsorbent (B), (A):(B), used in the carrier system is from 5:95 to 600:40.

* * * * *